US009628451B2

(12) United States Patent
Hsin et al.

(10) Patent No.: US 9,628,451 B2
(45) Date of Patent: Apr. 18, 2017

(54) POWER AND COST EFFICIENT PERIPHERAL INPUT

(71) Applicant: Intel Corporation, Santa Clara, CA (US)

(72) Inventors: Chih-Fan Hsin, Portland, OR (US); Moulishankar Chandrasekaran, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/565,488

(22) Filed: Dec. 10, 2014

(65) Prior Publication Data

US 2016/0173460 A1 Jun. 16, 2016

(51) Int. Cl.
*G06F 21/00* (2013.01)
*H04L 29/06* (2006.01)
*G06F 13/38* (2006.01)
*G06F 21/70* (2013.01)
*H04W 12/00* (2009.01)

(52) U.S. Cl.
CPC ........ *H04L 63/0457* (2013.01); *G06F 13/387* (2013.01); *G06F 21/70* (2013.01); *H04L 63/164* (2013.01); *H04L 63/168* (2013.01); *H04W 12/00* (2013.01); *Y02B 60/1228* (2013.01); *Y02B 60/1235* (2013.01)

(58) Field of Classification Search
CPC .......... G06F 21/70; G06F 21/71; G06F 21/74; G06F 21/82; G06F 21/83; G06F 21/85; H04W 12/00
See application file for complete search history.

(56) References Cited

U.S. PATENT DOCUMENTS

| 6,912,605 | B1 * | 6/2005 | Wright | G06F 21/83 |
| | | | | 341/29 |
| 7,835,521 | B1 * | 11/2010 | Pinheiro | G06F 3/0219 |
| | | | | 380/239 |
| 2006/0105712 | A1 | 5/2006 | Glass et al. | |
| 2009/0044028 | A1 | 2/2009 | Wong et al. | |
| 2012/0300380 | A1 * | 11/2012 | Lin | G06F 1/1616 |
| | | | | 361/679.09 |
| 2013/0282932 | A1 | 10/2013 | Robert et al. | |

(Continued)

FOREIGN PATENT DOCUMENTS

WO 2011-004958 A2 1/2011

OTHER PUBLICATIONS

Andrew Liszewski, This Dongle Let's You Use Your Laptop's Keyboard With Your Phone, Gizmodo.com, http://gizmodo.com/this-dongle-lets-you-use-your-laptops-keyboard-with-yo-1442951558, Oct. 9, 2013, 2 pages.

(Continued)

*Primary Examiner* — Edward Zee
(74) *Attorney, Agent, or Firm* — Jordan IP Law, LLC

(57) ABSTRACT

Systems and methods may provide for receiving, at a controller of a first device having a host processor, user input data and converting the user input data into one or more packets. Additionally, the one or more packets may be sent to a wireless communication component of the first device. In one example, the one or more packets are sent to the wireless communication component while the host processor is in one or more of a sleep state or a low power state.

20 Claims, 2 Drawing Sheets

(56) References Cited

U.S. PATENT DOCUMENTS

2014/0347279 A1* 11/2014 Chiang ................. G06F 3/0227
                                                                              345/168
2014/0359308 A1* 12/2014 Tsai ......................... H04L 9/14
                                                                              713/189

OTHER PUBLICATIONS

International Search Report and Written Opinion for PCT Application No. PCT/US2015/061334, mailed Mar. 11, 2016, 10 pages.

\* cited by examiner

POWER AND COST EFFICIENT PERIPHERAL INPUT

TECHNICAL FIELD

Embodiments generally relate to the entry of information into computing devices. More particularly, embodiments relate to power and cost efficient peripheral input for computing devices.

BACKGROUND

Handheld devices such as smart phones and tablet computers may have a touch screen for information entry instead of an integrated keyboard. Ergonomic considerations, however, may limit the usefulness of small form factor touch screens to the entry of short messages, search phrases and/or login information. While certain conventional handheld devices may be supplemented by a dedicated Bluetooth (e.g., Institute of Electrical and Electronics Engineers/IEEE 802.15.1-2005, Wireless Personal Area Networks) keyboard, the purchase of such a keyboard might be cost prohibitive from the perspective of the end user. In another example, wirelessly-sharing the keyboard of another device (e.g., a laptop) may involve the purchase and installation of a Bluetooth/USB (Universal Serial Bus, e.g., USB Specification 3.0, Rev. 1.0, Nov. 12, 2008, USB Implementers Forum) dongle that uses the operating system (OS) and other software running on the host processor of the device with an existing keyboard in order to collect and send the input data wirelessly. Such an approach may be inefficient due to additional hardware and power inefficiencies as the host processor being fully operational. Powering up the host processor of the device with an existing keyboard may also be time-consuming and inconvenient to the end user.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
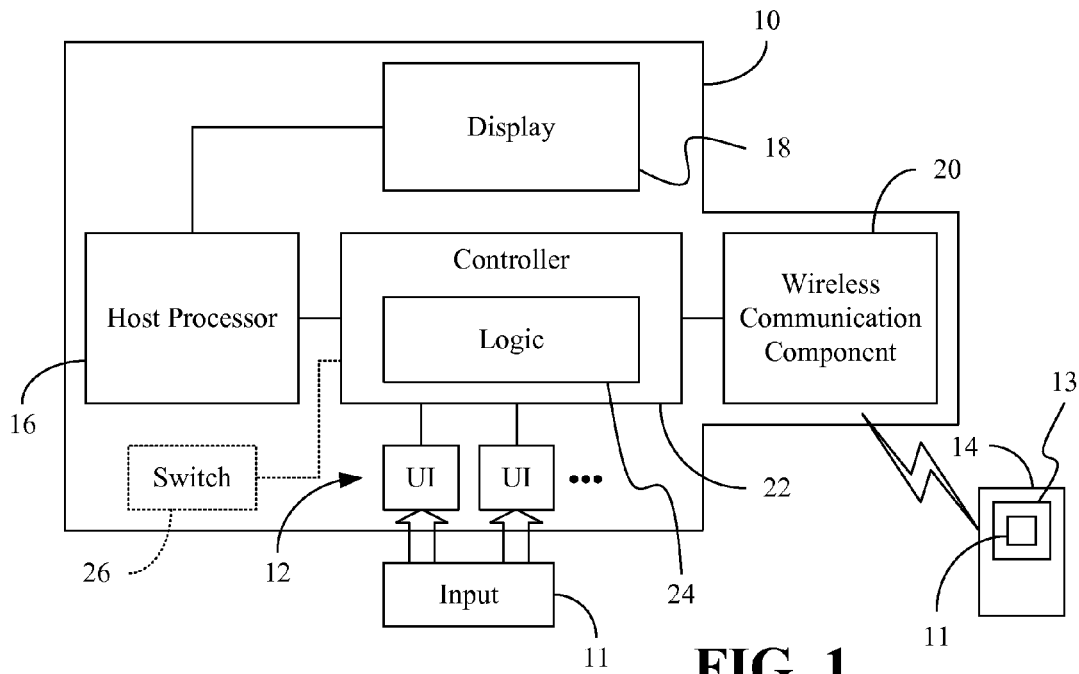
FIG. 1 is a block diagram of an example of a peripheral input computing architecture according to an embodiment.

Turning now to FIG. 1, a peripheral input computing architecture is shown in which one or more user interfaces (UIs) 12 of a first device 10 are used to enter information into a second device 14 that is paired with the first device 10. The first device 10 might be a computing device with a form factor of, for example, a desktop computer, notebook computer, etc., whereas the second device 14 may be a handheld device with a form factor of, for example, a smart phone, tablet computer, media player, personal digital assistant (PDA), mobile Internet device (MID), wearable computer, etc. Thus, the UIs 12 may include, for example, a keyboard, keypad, touch pad, touch screen, etc., that are generally larger in size and more ergonomically suitable for the entry of relatively long messages, the editing of documents, and so forth, than the UI of the second device 14.

As will be discussed in greater detail, user input 11 entered via the UIs 12 may be captured, converted and sent to the second device 14 without the participation of a host processor 16 (e.g., central processing unit/CPU) of the first device. Indeed, the information entry may be conducted without loading an operating system (OS) and while the host processor 16 is in a sleep state and/or low power state such as defined by industry standard specification, for example, a relatively deep Advanced Configuration and Power Interface (e.g., ACPI Specification, Rev. 5.0a, Dec. 6, 2011) idle state. Accordingly, the illustrated computing architecture may be both power efficient and convenient to the end user.

In the illustrated example, the first device 10 includes a display 18 coupled to the host processor 16, a wireless communication component 20 (e.g., Bluetooth component), and a controller 22 (e.g., embedded controller/EC or vendor-specific services hub). The controller 22, which may generally consume substantially less power than the host processor 16, may include logic 24 (e.g., firmware, configurable logic, fixed-functionality logic hardware, etc., or any combination thereof) to receive (e.g., intercept), at the controller 22, user input data from the UIs 12, wherein the UIs 12 may communicate with the controller 22 via, for example, an Inter-Integrated Circuit (I²C, e.g., I²C Specification UM10204, Rev. 03, Jun. 19, 2007, NXP Semiconductors) connection, System Management Bus (SMBus, e.g., SMBus Specification, SBS Implementers Forum, Ver. 2.0, Aug. 3, 2000) connection, Serial Peripheral Interface (SPI) connection, etc., or other suitable connection.

The logic 24 may also convert the user input data into one or more packets and send the one or more packets to the wireless communication component 20 for transmission to the second device 14. As already noted, the packets may be sent to the wireless communication component 20 while the host processor 16 is in a sleep state and/or low power state (e.g., without loading an OS). The second device 14 may include a wireless communication (e.g., Bluetooth) module and driver stack (not shown) to receive and process the packets for display and/or other purposes (e.g., authentication, storage). In the illustrated example, the user input 11 entered into the first device 10 via one or more of the UIs 12 is presented on a display 13 of the second device 14.

In one example, the logic 24 may encrypt the user input data (e.g., using a vendor-specific key) and package the encrypted user input data as vendor-specific human interface device (HID) data. In such a case, the second device 14 might include a vendor-specific driver and/or other software (not shown) to decrypt the HID data and send the decrypted HID data to an on-board operating system (OS) for further processing. The encryption/decryption approach may therefore enable the collaboration of the first device 10 with other devices to be controlled on a vendor-by-vendor basis (e.g., notebook computers containing Vendor A's technology may be used to enter information only into smart phones also containing Vendor A's technology).

Additionally, the first device 10 may optionally include a switch 26 that indicates whether the user input data is to be sent to the second device 14 or the host processor 16. For example, the switch 26 might be a dedicated hotkey or button on one of the UIs 12 (e.g., keyboard) connected to a pin of the controller 24, a softkey presented on the display 18, or other type of selectable item exposed on the first device 10 to a user of the first device 10. Accordingly, the logic 24 may also include a router component that determines the state of the switch 26. If the state of the switch 26 indicates that the user input data is to be sent to the second device 14, then the logic 24 may convert the user input data into the one or more packets and send the one or more packets to the wireless communication component 20. If, on the other hand, the state of the switch 26 indicates that the user input data is not to be sent to the second device 14, then the logic 24 may send the user input data to the host processor 16.

Figure 2:
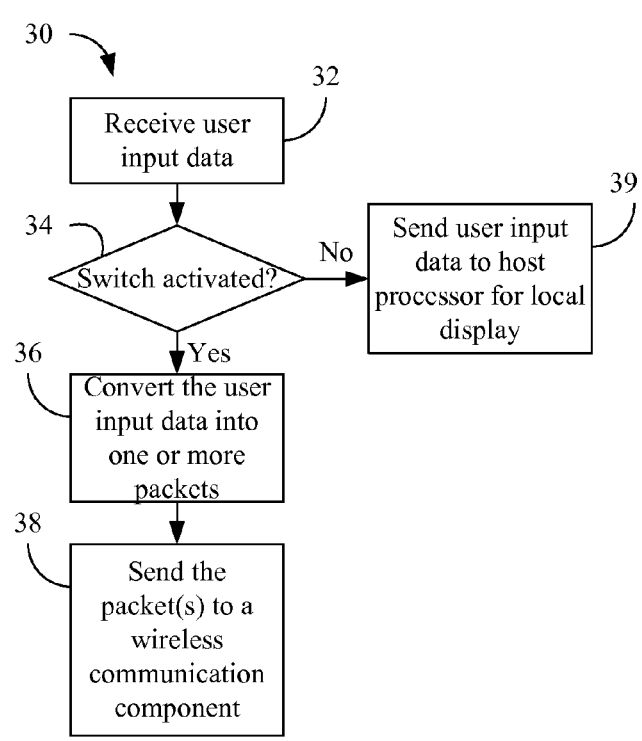
FIG. 2 is a flowchart of an example of a method of operating a controller according to an embodiment.

Turning now to FIG. 2, a method 30 of operating a controller is shown. The method 30 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 30 may be written in any combination of one or more programming languages, including an object oriented programming language such as Java, Smalltalk, C++ or the like and conventional procedural programming languages, such as the "C" programming language or similar programming languages.

Illustrated processing block 32 provides for receiving, at the controller, user input data. Block 32 might include receiving the user input data from a keyboard (e.g., integrated or peripheral), keypad, touch pad, touch screen, etc., over a connection such as, for example, an I²C, SMBus, SPI, or other pin/connection. The user input data may therefore include keystroke data, touchpad and/or touch screen coordinate data, and so forth. A determination may be made at block 34 as to whether a switch such as, for example, the switch 26 (FIG. 1), already discussed, has been activated. In the illustrated example, if the switch is activated, block 36 converts the user input data into one or more packets, wherein the one or more packets may be sent to a wireless communication component of the first device at block 38. As already noted, the wireless communication component may include a Bluetooth component that pairs with and connects to a second device. Moreover, the packets may be sent to the wireless communication component while the host processor of the first device is in a sleep state and/or low power state. If it is determined at block 34 that the switch is not activated, illustrated block 39 sends the user input data to the host processor for local display or other processing/storage.

Figure 3A:
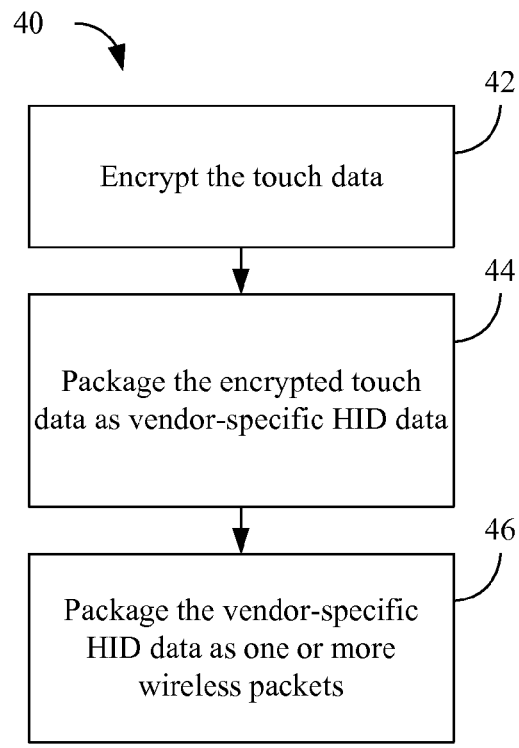
FIG. 3A is a flowchart of an example of a method of converting user input data into packets according to an embodiment.

FIG. 3A shows a method 40 of converting user input data into packets. The method 40 may therefore be optionally substituted for block 36 (FIG. 2), already discussed. The method 40 may also be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated block 42 provides for encrypting the user input data. Block 42 may include using a key such as, for example, a vendor-specific key to encrypt the user input data. The encrypted user input data may be packaged as vendor-specific HID data at block 44. Additionally, block 46 may provide for packaging the vendor-specific HID data as one or more wireless packets.

Figure 3B:
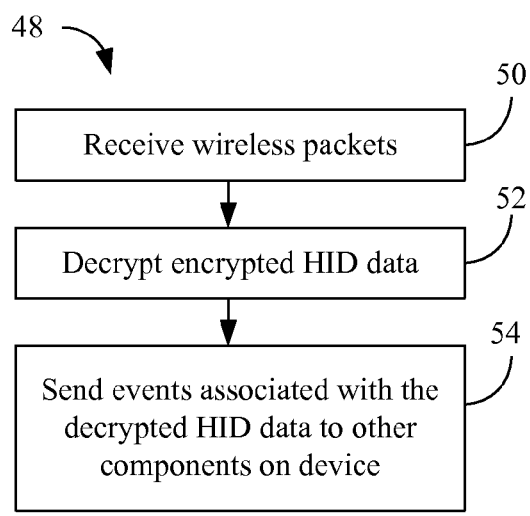
FIG. 3B is a flowchart of an example of a method of handling wireless packets according to an embodiment.

FIG. 3B shows a method 48 of handling wireless packets. The method 48 may therefore be optionally implemented in a device such as, for example, the second device 14 (FIG. 1), already discussed. The method 48 may also be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. In processing block 50, on or more wireless packets may be received, wherein a vendor-specific HID driver on the second device might include logic to decrypt the encrypted HID data at block 52. Illustrated block 54 sends one or more events associated with the decrypted HID data to various components on the second device.

Thus, in one optional example, the user input data may be encrypted and packaged into one or more vendor-specific packets. The vendor-specific packets may then be packaged into wireless (e.g., Bluetooth) packets for transmission. Such an option may provide the capability for vendor-differentiation. In another example, the user input data might be packaged into one or more standard HID packets (e.g., not vendor-specific). The standard HID packets may then be packaged into wireless (e.g., Bluetooth) packets for transmission. In such a case, existing Bluetooth security features may be used, wherein most other devices may be able to interpret the received data.

Additional Notes and Examples

Example 1 may include a first device comprising a display, a host processor coupled to the display, a user interface to capture user input data, the user interface including one or more of a keyboard, a keypad, a touch pad or a touch screen, a wireless communication component, and a controller including logic implemented at least partly in fixed-functionality hardware to receive, at the controller, the user input data, convert the user input data into one or more packets, and send the one or more packets to the wireless communication component.

Example 2 may include the first device of Example 1, wherein the one or more packets are to be sent to the wireless communication component while the host processor is in one or more of a sleep state or a low power state.

Example 3 may include the first device of Example 1, wherein the logic is to encrypt the user input data, and package the encrypted user input data as vendor-specific human interface device (HID) data.

Example 4 may include the first device of Example 1, further including a switch, wherein the logic is to determine a state of the switch, and wherein the user input data is to be converted into the one or more packets and the one or more packets are to be sent to the wireless communication component if the state of the switch indicates that the user input data is to be sent to a second device that is paired with the first device.

Example 5 may include the first device of Example 4, wherein the logic is to send the user input data to the host processor if the state of the switch indicates that the user input data is not to be sent to the second device.

Example 6 may include the first device of any one of Examples 1 to 5, wherein the one or more packets are to be sent to a Bluetooth component.

Example 7 may include a controller of a first device having a host processor, comprising logic implemented at least partly in fixed-functionality hardware to receive, at the controller, user input data, convert the user input data into one or more packets, and send the one or more packets to a wireless communication component of the first device.

Example 8 may include the controller of Example 7, wherein the one or more packets are to be sent to the wireless communication component while the host processor is in one or more of a sleep state or a low power state.

Example 9 may include the controller of Example 7, wherein the logic is to encrypt the user input data, and package the encrypted user input data as vendor-specific human interface device (HID) data.

Example 10 may include the controller of Example 7, wherein the logic is to determine a state of a switch on the first device, and wherein the user input data is to be converted into the one or more packets and the one or more packets are to be sent to the wireless communication component if the state of the switch indicates that the user input data is to be sent to a second device that is paired with the first device.

Example 11 may include the controller of Example 10, wherein the logic is to send the user input data to the host processor if the state of the switch indicates that the user input data is not to be sent to the second device.

Example 12 may include the controller of any one of Examples 7, wherein the one or more packets are to be sent to a Bluetooth component.

Example 13 may include a method of operating a controller of a first device having a host processor, comprising receiving, at the controller, user input data, converting the user input data into one or more packets, and sending the one or more packets to a wireless communication component of the first device.

Example 14 may include the method of Example 13, wherein the one or more packets are sent to the wireless communication component while the host processor is in one or more of a sleep state or a low power state.

Example 15 may include the method of Example 13, wherein converting the user input data includes encrypting the user input data; and packaging the encrypted user input data as vendor-specific human interface device (HID) data.

Example 16 may include the method of Example 13, further including determining a state of a switch on the first device, wherein the user input data is converted into the one or more packets and the one or more packets are sent to the wireless communication component if the state of the switch indicates that the user input data is to be sent to a second device that is paired with the first device.

Example 17 may include the method of Example 16, further including sending the user input data to the host processor if the state of the switch indicates that the user input data is not to be sent to the second device.

Example 18 may include the method of any one of Examples 13, wherein the one or more packets are sent to a Bluetooth component.

Example 19 may include at least one computer readable storage medium comprising a set of instructions which, when executed by a first device having a host processor, cause the first device to receive, at a controller of the first device, user input data, convert, at the controller, the user input data into one or more packets, and send, from the controller, the one or more packets to a wireless communication component of the first device.

Example 20 may include the at least one computer readable storage medium of Example 19, wherein the one or more packets are to be sent to the wireless communication component while the host processor is in one or more of a sleep state or a low power state.

Example 21 may include the at least one computer readable storage medium of Example 19, wherein the instructions, when executed, cause the first device to encrypt the user input data; and package the encrypted user input data as vendor-specific human interface device (HID) data.

Example 22 may include the at least one computer readable storage medium of Example 19, wherein the instructions, when executed, cause the first device to determine a state of a switch on the first device, wherein the user input data is to be converted into the one or more packets and the one or more packets are to be sent to the wireless communication component if the state of the switch indicates that the user input data is to be sent to a second device that is paired with the first device.

Example 23 may include the at least one computer readable storage medium of Example 22, wherein the instructions, when executed, cause the first device to send the user input data to the host processor if the state of the switch indicates that the user input data is not to be sent to the second device.

Example 24 may include the at least one computer readable storage medium of any one of Examples 19, wherein the one or more packets are to be sent to a Bluetooth component.

Example 25 may include a controller of a first device having a host processor, comprising means for performing the method of any of Examples 13 to 18, in any combination or sub-combination.

Thus, techniques described herein may enable cost savings to be achieved with regard to peripherals to handheld devices by reusing input devices of existing hardware. Additionally, intelligent re-use of existing silicon (e.g., embedded controller hardware or vendor-specific service hub hardware) to perform wireless control and communication functions may further reduce cost. Moreover, vendor-specific features may enable manufacturers to differentiate platforms from an end user perspective.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A first device comprising:
 a display;
 a host processor coupled to the display;
 a user interface to capture user input data, the user interface including one or more of a keyboard, a keypad, a touch pad or a touch screen;
 a wireless communication component; and
 a controller including logic implemented at least partly in fixed-functionality hardware to,
  receive, at the controller, the user input data,
  convert the user input data into one or more packets, and
  send the one or more packets to the wireless communication component, wherein the logic is to:
   configure the user input data into one or more of standard human interface device (HID) packets or encrypted vendor-specific HID packets,
   package the standard HID packets into standard wireless HID packets when the user input data is configured into the standard HID packets, and
   package the encrypted vendor-specific HID packets into vendor-specific wireless HID packets when the user input data is configured into the encrypted vendor-specific HID packets,
   wherein the vendor-specific HID packets are to be encrypted with a vendor specific key.

2. The first device of claim 1, wherein the one or more packets are to be sent to the wireless communication component while the host processor is in one or more of a sleep state or a low power state.

3. The first device of claim 1, further including a switch, wherein the logic is to determine a state of the switch, and wherein the user input data is to be converted into the one or more packets and the one or more packets are to be sent to the wireless communication component if the state of the switch indicates that the user input data is to be sent to a second device that is paired with the first device.

4. The first device of claim 3, wherein the logic is to send the user input data to the host processor if the state of the switch indicates that the user input data is not to be sent to the second device.

5. The first device of claim 1, wherein the one or more packets are to be sent to a Bluetooth component.

6. A controller of a first device, comprising:
 logic implemented at least partly in fixed-functionality hardware to,
  receive, at the controller, user input data,
  convert the user input data into one or more packets, and
  send the one or more packets to a wireless communication component of the first device,
 wherein the logic is to:
  configure the user input data into one or more of standard human interface device (HID) packets or encrypted vendor-specific HID packets,
  package the standard HID packets into standard wireless HID packets when the user input data is configured into the standard HID packets, and
  package the encrypted vendor-specific HID packets into vendor-specific wireless HID packets when the user input data is configured into the encrypted vendor-specific HID packets,
  wherein the vendor-specific HID packets are to be encrypted with a vendor specific key.

7. The controller of claim 6, wherein the one or more packets are to be sent to the wireless communication component while a host processor of the first device is in one or more of a sleep state or a low power state.

8. The controller of claim 6, wherein the logic is to determine a state of a switch on the first device, and wherein the user input data is to be converted into the one or more packets and the one or more packets are to be sent to the wireless communication component if the state of the switch indicates that the user input data is to be sent to a second device that is paired with the first device.

9. The controller of claim 8, wherein the logic is to send the user input data to a host processor of the first device if the state of the switch indicates that the user input data is not to be sent to the second device.

10. The controller of claim 6, wherein the one or more packets are to be sent to a Bluetooth component.

11. A method comprising:
 receiving, at a controller of a first device having a host processor, user input data;
 converting the user input data into one or more packets; and
 sending the one or more packets to a wireless communication component of the first device;
 wherein converting the user input data includes:
  configuring the user input data into one or more of standard human interface device (HID) packets or encrypted vendor-specific HID packets,
  packaging the standard HID packets into standard wireless HID packets when the user input data is configured into the standard HID packets, and
  packaging the encrypted vendor-specific HID packets into vendor-specific wireless HID packets when the user input data is configured into the encrypted vendor-specific HID packets,
  wherein the vendor-specific HID packets are encrypted with a vendor specific key.

12. The method of claim 11, wherein the one or more packets are sent to the wireless communication component while the host processor is in one or more of a sleep state or a low power state.

13. The method of claim 11, further including determining a state of a switch on the first device, wherein the user input data is converted into the one or more packets and the one or more packets are sent to the wireless communication component if the state of the switch indicates that the user input data is to be sent to a second device that is paired with the first device.

14. The method of claim 13, further including sending the user input data to the host processor if the state of the switch indicates that the user input data is not to be sent to the second device.

15. The method of claim 11, wherein the one or more packets are sent to a Bluetooth component.

16. At least one non-transitory computer readable storage medium comprising a set of instructions which, when executed by a first device having a host processor, cause the first device to:
receive, at a controller of the first device, user input data;
convert the user input data into one or more packets;
send the one or more packets to a wireless communication component of the first device;
configure the user input data into one or more of standard human interface device (HID) packets or encrypted vendor-specific HID packets;
package the standard HID packets into standard wireless HID packets when the user input data is configured into the standard HID packets; and
package the encrypted user input data as vendor-specific HID packets into vendor-specific wireless HID packets when the user input data is configured into the encrypted vendor-specific HID packets,
wherein the vendor-specific HID packets are encrypted with a vendor specific key.

17. The at least one non-transitory computer readable storage medium of claim 16, wherein the one or more packets are to be sent to the wireless communication component while the host processor is in one or more of a sleep state or a low power state.

18. The at least one non-transitory computer readable storage medium of claim 16, wherein the instructions, when executed, cause the first device to determine a state of a switch on the first device, wherein the user input data is to be converted into the one or more packets and the one or more packets are to be sent to the wireless communication component if the state of the switch indicates that the user input data is to be sent to a second device that is paired with the first device.

19. The at least one non-transitory computer readable storage medium of claim 18, wherein the instructions, when executed, cause the first device to send the user input data to the host processor if the state of the switch indicates that the user input data is not to be sent to the second device.

20. The at least one non-transitory computer readable storage medium of claim 16, wherein the one or more packets are to be sent to a Bluetooth component.

* * * * *